US012560464B2

(12) United States Patent
Cerami et al.

(10) Patent No.: US 12,560,464 B2
(45) Date of Patent: Feb. 24, 2026

(54) APPARATUS FOR MEASURING A FLUID

(71) Applicant: PIETRO FIORENTINI S.p.A., Arcugnano (IT)

(72) Inventors: Pietro Cerami, Seveso (IT); Lorenzo Memè, Rosate (IT)

(73) Assignee: PIETRO FIORENTINI S.P.A., Arcugnano (IT)

( * ) Notice: Subject to any disclaimer, the term of this patent is extended or adjusted under 35 U.S.C. 154(b) by 307 days.

(21) Appl. No.: 18/560,937

(22) PCT Filed: May 17, 2022

(86) PCT No.: PCT/IB2022/054568
§ 371 (c)(1),
(2) Date: Nov. 15, 2023

(87) PCT Pub. No.: WO2022/243862
PCT Pub. Date: Nov. 24, 2022

(65) Prior Publication Data
US 2024/0255327 A1     Aug. 1, 2024

(30) Foreign Application Priority Data
May 17, 2021     (IT) ........................ 102021000012677

(51) Int. Cl.
*G01F 1/50*     (2006.01)
*G01F 15/02*    (2006.01)
*G01F 15/10*    (2006.01)

(52) U.S. Cl.
CPC .............. *G01F 1/50* (2013.01); *G01F 15/022* (2013.01); *G01F 15/10* (2013.01)

(58) Field of Classification Search
CPC .......... G01F 1/50; G01F 15/022; G01F 15/10; G01F 15/02; G01F 15/04; G01F 15/14; G01F 22/02; G01F 1/34
See application file for complete search history.

(56) References Cited

U.S. PATENT DOCUMENTS 5,469,749 A * 11/1995 Shimada ................. G01F 1/383
73/861.47
5,570,729 A     11/1996 Mutter
(Continued)

FOREIGN PATENT DOCUMENTS

EP            3088850 A1 * 11/2016 ............... G01F 1/44
IT     201900009168 A1    12/2020
(Continued)

*Primary Examiner* — Francis C Gray
(74) *Attorney, Agent, or Firm* — Carmel Patent Agency; Robert Ballarini

(57) ABSTRACT

An apparatus for measuring a fluid, and in particular of the type suitable for measuring the flow of a fluid, for example a gas or a liquid, present and circulating in the inside a pipeline, such as for example a pipeline of the natural gas distribution network includes:
a first containment casing;
an electronic processing and/or control unit;
at least a first absolute pressure sensor;
at least a second absolute pressure sensor; and
at least first and second temperature sensors.
The electronic processing and/or control unit is electronically connected to the first absolute pressure sensor; and the electronic unit includes at least one processing module configured to receive the corresponding electronic signals containing and/or representative of the first absolute pressure measurement of the fluid.

20 Claims, 1 Drawing Sheet

(56) References Cited

U.S. PATENT DOCUMENTS

2019/0204128 A1* 7/2019 Somani ................... G01F 1/692
2021/0116945 A1* 4/2021 Kayaba ............... G05D 7/0623

FOREIGN PATENT DOCUMENTS

KR 20210095802 A * 8/2021 ............... G01F 1/34
WO 2020005149 A2 1/2020

* cited by examiner

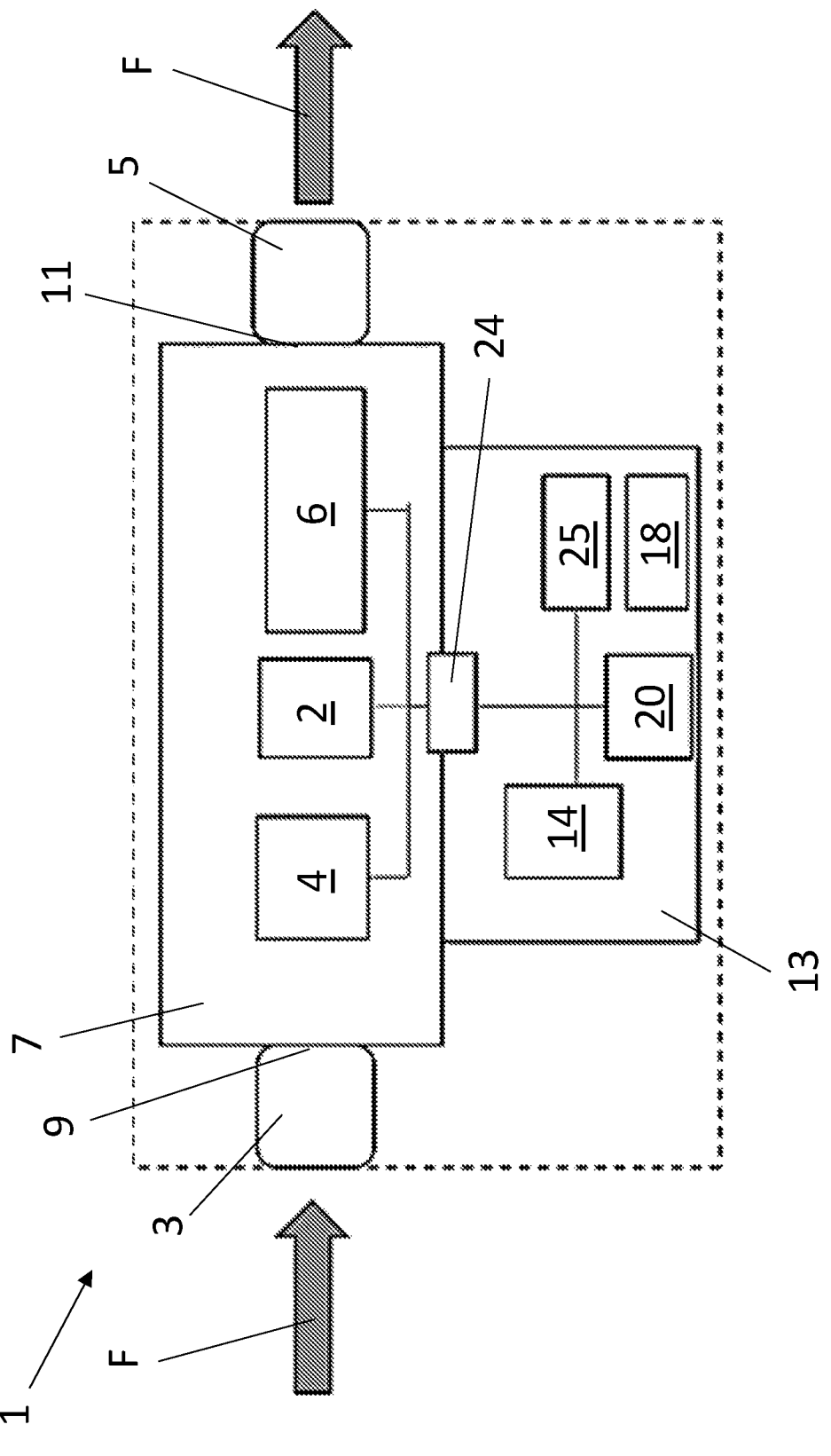

APPARATUS FOR MEASURING A FLUID

FIELD OF THE TECHNIQUE

The present invention relates to an apparatus for measuring a fluid, and in particular of the type suitable for measuring the flow of a fluid, for example a gas or a liquid, present and circulating in the inside a pipeline, such as for example a pipeline of the natural gas distribution network.

STATE OF THE ART

Currently, the so-called "Smart Meter" devices—also called "remotely managed meters"—are known, which are nowadays widely used to measure the consumption (civil and industrial) of the quantity of energy consumed in the form of gas or the quantity of water from an aqueduct used by a user.

Generally, these known devices comprise two electronic modules:

a first module which is normally installed inside the containment casing of the measuring equipment and is therefore in contact with the fluid that enters and/or circulates inside the equipment itself, and a second module which is installed externally to the casing, generally in correspondence with one of its walls, and is not in contact with the gas.

More in detail, the first module (inside the casing) includes sensors configured to detect a series of quantities (generally of flow rate, and/or pressure and/or temperature) relating to the gas that enters and circulates inside the equipment and this in order to then calculate the corresponding volume; suitably, the first module can be provided (or even not) with a microprocessor connected to the sensors. The second module (external to the casing) normally comprises a microprocessor which processes the signals representing the quantities detected by the first internal module and calculates any derived quantities. Furthermore, the second module comprises a display for viewing the values relating to the received and/or calculated quantities, and/or comprises means for their remote transmission.

Both modules are generally powered by batteries, which can be non-replaceable or entirely or only partially replaceable.

In the environment of the production and marketing of equipment for measuring fluids, and in particular in the sector of gas or water smart-metering, the need has long been felt to obtain, in addition to the aforementioned flow measurement, and/or pressure and/or absolute temperature of the fluid, also relative measurements, i.e. with respect to ambient values.

More in detail, some applications require an absolute measurement (Pa); for example in gas when you are asked to convert volumes to reference thermodynamic conditions; other applications require a relative measurement of the pressure (Pr) to detect particular operating conditions for control purposes.

In the current state of the art, the known type of apparatus provides that the pressure sensor of the first module must be able to detect the difference in pressure between the fluid inside the pipe and the environment and, at the same time, must ensure that no fluid leaks are produced from the piping itself (under pressure) to the external environment.

The solutions of the known type generally provide for the use of a sensor positioned to cross the wall of the pipe and equipped with hydraulic sealing gaskets, so as to guarantee the tightness of the fluid inside the pipe.

Practically, the known solution provides for a hole in the casing of the first module for housing the sensor inside it so that the latter is in contact on one side with the fluid and on the other with the environment, in which the hole made on the casing is suitably equipped with the aforementioned sealing gaskets or the like to prevent the fluid from escaping.

These solutions, realized in this way and in the state of the art, have proved to be not free from drawbacks in practice.

The main drawback resides in the fact that the perforation to allow the sensor to detect both the fluid pressure and the ambient pressure is in fact a high risk area for possible fluid leaks.

In this situation, the known type of apparatus is obligatorily subjected to frequent periodic maintenance in order to verify the continuous state of hydraulic retention of the seals.

Furthermore, making the hole and arranging the sensor are laborious and therefore require a lot of installation time.

These drawbacks often lead to an increase in the general costs of production, installation and management of known equipment.

A further drawback resides in the fact that known equipment normally has generous dimensions, making it inconvenient to assemble and install.

US2021/116945 describes a safety device for gas which provides for the use of a first absolute pressure sensor, which is positioned inside the gas passage duct to measure the absolute pressure of the gas, and of a second absolute pressure sensor, which is positioned externally with respect to the gas passage duct to measure the absolute atmospheric pressure. Furthermore, the device comprises a unit for calculating the differential pressure of the gas on the basis of the absolute pressures measured by the first sensor and the second sensor and also comprises a control circuit which is configured to command the closure of a safety valve when an anomalous value of the calculated differential pressure is detected.

OBJECTIVES OF THE INVENTION

The object of the invention is to propose an apparatus for measuring a fluid which allows to overcome, at least in part, the aforementioned drawbacks present in traditional solutions.

Another object of the invention is to propose an apparatus which is inexpensive and, at the same time, allows to calculate in a particularly precise way both the volume of the fluid at the reference thermodynamic conditions and the relative pressure of the fluid.

Another object of the invention is to propose an apparatus which reduces the presence of points with a high risk of hydraulic leaks.

Another object of the invention is to propose an apparatus which is constructively simple, safe and reliable.

Another object of the invention is to propose an apparatus which, even in the event of a fault in the external module, does not require the replacement of the entire apparatus.

Another object of the invention is to propose an apparatus which allows to detect both absolute and relative quantities of a fluid (even simultaneously), ie with respect to reference quantities of the external environment.

Another object of the invention is to propose an apparatus which allows to make the measurement of the absolute pressure economically convenient if used, as in the case in which the fluid is a gas, for the conversion of volumes to the reference thermodynamic conditions.

Another object of the invention is to propose an apparatus which allows to make the measurement of the operating pressure of a fluid constructively simple, safe and economically convenient, for example used for control purposes of networks.

Another object of the invention is to propose an apparatus which allows the replacement in the field of its more easily perishable components.

Another object of the invention is to propose an apparatus which is an improvement and/or alternative to traditional ones.

Another object of the invention is to propose an apparatus which has high safety standards.

Another object of the invention is to propose an apparatus which allows an accurate and precise calculation of the gas volumes, also for fiscal purposes.

Another object of the invention is to propose an apparatus which can be manufactured simply, quickly and at low costs.

Another object of the invention is to propose an apparatus which is highly compact and integrated.

Another purpose of the invention is to propose an apparatus which is easily and quickly installed, as well as replaceable, at the point of delivery to a user of the gas, supplied by a distribution network, and which is simple and intuitive to use.

Another object of the invention is to propose an apparatus which has an alternative characterization, both in constructive and functional terms, with respect to traditional ones.

Another object of the invention is to propose an apparatus which, following a fault, can allow the recovery of the information (for example consumption) processed up to the moment immediately prior to the fault itself.

SUMMARY OF THE INVENTION

All these objects, either alone or in any combination thereof, and others which will result from the following description are achieved, according to the invention, with an apparatus as defined in claim 1.

DESCRIPTION OF THE FIGURES

The present invention it is further clarified hereinafter in some of its preferred embodiments reported for purely illustrative and non-limiting purposes with reference to the attached drawing table, in which FIG. 1 shows a schematic view of an apparatus according to the invention.

DETAILED DESCRIPTION OF THE INVENTION AND OF SOME OF ITS PREFERRED EMBODIMENTS

As can be seen from the figures, the apparatus 1 according to the invention is of the type configured to perform a series of measurements on the fluid F passing through said apparatus. Preferably, the apparatus 1 is an apparatus of the type generally used as a meter or meter for the flow of fluid F which passes through the section of a pipe on which said apparatus is intended to be installed.

In particular, the apparatus 1 according to the invention is configured to be crossed, at least in part, by a flow of fluid.

Conveniently, the equipment 1 can be associated to a fluid inlet 3, for example defined by a pipe section upstream of the equipment, and to a gas outlet 5, for example defined by a pipe section downstream of said device.

The apparatus 1 for measuring a fluid F according to the invention is in particular of the type suitable for measuring the flow of fluid F present and circulating inside a pipe, and comprises a first containment casing 7 provided with a first opening 9 for the inlet of a flow of fluid F inside it and a second opening 11 for the outlet of the fluid.

Conveniently, the first opening 9 is fluidly in communication with the inlet 3, to allow the fluid F to enter the first casing 7, and the second opening 11 is fluidly in communication with the outlet 5, to allow the fluid F, which entered/circulated in the first enclosure 7, to exit from the latter.

Preferably, the first containment casing 7 is watertight to prevent fluid from escaping to the outside. Preferably, it is formed by two or more parts joined together in such a way as to guarantee the airtightness of the entire first casing 7. Preferably, the first containment casing 7 is made of polymeric material such as for example polyethylene. Otherwise, the first containment casing 7 can be made of metal, in particular of metal sheet.

Conveniently, inside the first casing 7 there is housed an interception valve (not shown in the attached figures) of the flow of fluid that passes through the apparatus and is directed towards the outlet 5. Preferably, said interception valve is a safety valve of the on-off type.

The apparatus also conveniently comprises at least a first sensor 2 which is arranged and configured to detect at least a first absolute pressure measurement $P_{AF}$ of said fluid (F) which passes through and/or circulates in said first enclosure 7.

Conveniently, the first sensor 2 is housed inside the first casing 7.

Conveniently, at least one further sensor can be housed inside the first casing 7 for detecting a corresponding quantity of the fluid flow F that passes through and/or circulates in the first casing 7 itself.

Conveniently, the apparatus 1 comprises a plurality of further sensors which are configured to detect corresponding quantities of the fluid flow F that enters and passes through said apparatus 1.

Preferably, in addition to the first sensor 2, the apparatus 1 can comprise a corresponding further sensor 6 to detect the flow rate of the fluid F that enters and/or passes through the apparatus 1. The first sensor 2 and/or the further sensors 6 are traditional in themselves and, therefore, will not be described further.

Conveniently, said further sensor 6 can comprise a membrane-type flow sensor which comprises a traditional mechanical system (for example comprising a crank mechanism connected to a pin) which is associated with a system (encoder and optical sensors) for detecting and converting into electronic pulses, in particular, the mechanical system alone or both of said systems can be provided inside the casing and, moreover, suitably, the detection and conversion system can be connected to a corresponding electronic calculation and management (for example defined by the electronic unit 25) as described in detail below.

Conveniently, said further sensor 6 can comprise at least one flow sensor of the static type, preferably ultrasonic or thermo-mass.

The apparatus 1 can advantageously comprise a second containment casing 13, fluidically separated from the first casing 7 and configured to be placed in fluid communication with the air of an external environment A.

Preferably, the second containment casing 13 is watertight with respect to the first containment casing 7 and in particular it is configured to be watertight with respect to the inside of the pipe in which the fluid F flows.

The apparatus advantageously comprises at least one second sensor 14 which is arranged and configured to detect at least a second measurement of absolute pressure $P_{AA}$ of said external environment A.

Preferably, the second sensor 14 is housed outside the first casing 7.

Preferably, the second sensor 14 is housed inside the second casing 13, and/or is associated with the latter. Conveniently, a further second sensor (not shown) can be housed inside the second casing 13 which is configured for detecting a corresponding size of the air in the external environment A.

Furthermore, the apparatus 1 object of the present invention comprises an electronic processing and/or control unit 25 which is electronically connected to the first sensor 2 and to the second sensor 14 and configured to receive the readings made by the first sensor 2 and the second sensor 14.

Preferably, the electronic unit 25 is housed inside the second casing 13.

Advantageously, in accordance with the preferential embodiment of the present invention, the first sensor 2 is configured to detect at least a first measurement of the absolute pressure $P_{AF}$ of the fluid F and send to the electronic unit 25 at least one first electronic signal containing the first $P_{AF}$.

Furthermore, the second sensor 14 is configured to detect at least a second absolute pressure measurement $P_{AA}$ of the external environment A and send to the electronic unit 25 at least a second electronic signal containing the second measurement $P_{AA}$.

Advantageously, the electronic unit 25 comprises at least one processing module configured to receive the first electronic signal and the second electronic signal, suitably processing both the first and second electrical signals, and to calculate, at least on the basis of them, a value of relative pressure $P_R$ of the fluid F, in particular according to the formula $P_R = P_{AF} - P_{AA}$.

In this way, the apparatus object of the present invention is able, at the same time, to calculate the absolute pressure of the fluid, the relative pressure of the fluid and to maintain an optimal impermeability of the pipe with respect to the external environment thanks to the provision of the first and second sensors arranged inside and outside the pipe itself.

Advantageously, the electronic unit 25 comprises an electronic board equipped with a microprocessor or a microcontroller. Conveniently, the second sensor 14 can be of the electronic type and be provided with its own electronic card or be connected to a common electronic card (for example defined by the electronic unit 25) provided inside the second casing 13.

The equipment 1 it also advantageously comprises at least one memory unit. Conveniently, this at least one memory unit is electronically connected to the electronic unit 25 and is defined by an electronic board which houses at least one memory, preferably non-volatile, for example a ROM or EPROM or EEPROM or flash memory, or even volatile, for example RAM.

Conveniently, the at least one memory unit is housed inside the second containment casing 13 and is electronically connected to the electronic unit 25 and contains algorithms for calculating at least the relative pressure value $P_R$ of the fluid F.

Preferably, the memory unit can be integrated inside the electronic unit 25, in particular if the latter comprises a microcontroller. Preferably, the memory unit can be integrated in an electronic card provided inside one or more of said sensors 2 of the first module 4.

Advantageously, the apparatus 1 also comprises a user interface (not shown in the attached figures)—for example a push-button panel associated with a visualization display or a touch-screen type display—configured to allow the user to interact with the electronic unit 25. Conveniently, the data received and/or processed by said electronic unit 25.

Advantageously, the apparatus also comprises remote communication means, preferably transmission or transceiver means with a possible remote unit. Conveniently, said transmission or transceiver means can be of the wireless type (in particular via infrared or via radio, for example wi-fi). Conveniently, these transmission or transceiver means can be connected and/or integrated into the electronic board of the electronic unit 25. Preferably, the communication means can be configured to allow the equipment 1 to interact and exchange data and/or information and/or commands with an external portable device (not shown), such as a smartphone, tablet or computer. Advantageously, the communication means can be configured to allow the apparatus 1 to interact and exchange data and/or information and/or commands with an external processing unit. Preferably, the external processing unit can define an external (remote) central unit which is configured to receive information from one or more devices 1.

Advantageously, the first containment casing 7 is intended to be housed inside the pipe. in which the fluid F circulates and the second containment casing 13 is intended to be housed outside the pipe. Conveniently, the first sensor 2 is electronically connected to the electronic unit 25 by means of connection means 24 intended to be placed to cross the pipe in a watertight manner.

Conveniently, the first sensor 2, housed inside the first casing 7, is connected by means of connection means 24, preferably electrical, for example an electrical signal transmission cable, preferably a flat cable of the "FFC" type. Conveniently, the electric cable can pass from the inside to the outside of said first casing 7 in correspondence with the contact areas provided between the flanges of two half-shells defining said first casing (as provided for example in EP2810024 or in EP300256, the contents of which here it is intended entirely incorporated by reference) and/or in correspondence with a passage opening, suitably sealed, defined in a wall or in correspondence of said flanges. In particular, the electronic unit 25 can be connected to the sensor (s) 2 housed inside the first containment casing, obviating the risk of the fluid F leaking from the pipeline.

Advantageously, the apparatus 1 also comprises at least one source of electrical energy 18, preferably electrically connected with the first sensor 2, the second sensor 14 and the electronic unit 25 to power them electrically. In other words, said at least one source of electrical energy 18 comprises at least an accumulation unit (battery or cell) which is connected directly or by means of the electronic board of the electronic unit 25 to the various components in order to supply the electrical energy for their operation.

Advantageously, the processing module of the electronic unit 25 is configured to calculate at least the relative pressure value $P_R$ of the fluid F as the difference between the first measurement of absolute pressure $P_{AF}$ of the fluid F contained in the first electronic signal and the second measurement of absolute pressure $P_{AA}$ of the external environment A contained in the second electronic signal.

In other words, advantageously, the first sensor 2 detects the aforementioned first measurement of the absolute pressure $P_{AF}$ of the fluid F which is equal to the sum of the relative pressure value $P_R$ of the fluid F and the absolute pressure value $P_{AA}$ of the external environment A.

With the term "absolute pressure" we shall hereinafter mean a pressure value of any fluid (be it the fluid F flowing inside the pipe or the air of the external environment A) regardless of further pressure values, that is the pressure with respect to the zero pressure of the absolute vacuum.

Otherwise, the term "relative pressure" must hereinafter be understood as a pressure value of the fluid F (be it gas or liquid, for example combustible gas or water from the aqueduct) with respect to the pressure of the external environment A, or with respect to the air pressure of the environment A which is external to the pipeline within which the fluid F flows and/or circulates.

Conveniently, in a possible embodiment, the first sensor 2, the second sensor 4 and the electronic unit 25 are advantageously configured to measure the aforementioned values on the basis of reference thermodynamic conditions, ie on the basis of the temperature range of the fluid F and/or ambient temperature and/or atmospheric pressure of the external environment, which are predetermined on the basis of the environment in which the apparatus 1 is intended to be used.

Conveniently, the electronic unit 25 comprises at least one receiving module (not illustrated in the attached figures) electronically connected to the first sensor 2 and to the second sensor 14 and configured to receive and acquire the first electronic signal and the second electronic signal periodically.

The receiving module can be implemented in the electronic unit 25. Otherwise, the receiving module can be implemented by means of at least one dedicated electronic card, for example pre-printed, electrically connected to the first sensor 2 and to the second sensor 14.

The first sensor 2 for the detection of the absolute pressure $P_{AF}$ of the fluid F is preferably chosen so as to measure this pressure with an accuracy class required by the specific field of application.

More clearly, the first sensor 2 can be advantageously configured to detect the first measurement $P_{AF}$ of the absolute pressure of the fluid F with a predetermined maximum reading error $\varepsilon_{AF}$ in absolute value, in particular the first sensor 2 is configured to measure the absolute pressure of the fluid F on the basis of the reference thermodynamic conditions, ie in correspondence with a predetermined temperature range of the fluid F.

Advantageously, the temperature range within which the pressure value $P_{AF}$ is determined on the basis of a predetermined temperature of the fluid F with which the first sensor 2 must operate.

The maximum reading error $\varepsilon_{AF}$ of the first measurement $P_{AF}$ of absolute pressure of the fluid F is suitably chosen taking into account the range of variability of the relative pressure of the fluid and the range of variability of the atmospheric pressure of the environment in which the appliance 1 is intended to be used.

The second sensor 14 detects the aforementioned second absolute pressure measurement $P_{AA}$ of the external environment A so that this measurement is within an accuracy class required by the specific field of application.

More clearly, the second sensor 14 can advantageously be configured to detect the second absolute pressure measurement $P_{AA}$ of the external environment A with a predetermined maximum reading error $\varepsilon_{AA}$ in absolute value, in particular the second sensor 14 is configured to measure the second pressure absolute of the fluid F on the basis of the reference thermodynamic conditions, ie in correspondence with a predetermined range of temperature and/or atmospheric pressure of the external environment. In particular, let $\varepsilon_{max\_}P_{RF}$ and $\varepsilon_{max\_}P_{AF}$ respectively be the maximum errors (thus defining corresponding threshold values) allowed by the application of smart metering (preferential for the present invention) for the measurement of the relative pressure of the fluid $P_{RF}$ and for the measurement of the absolute pressure of the fluid $P_{AF}$, the two sensors 2, 14 are suitably configured to satisfy both of the following inequalities:

$$\varepsilon_{AA} \leq \varepsilon_{max\_}P_{AF};$$

$$\varepsilon_{AF} + \varepsilon_{AA} \leq \varepsilon_{max\_}P_{RF};$$

$$\text{ie } \varepsilon_{AF} \leq \varepsilon_{max\_}P_{RF} - \varepsilon_{AA}$$

Preferably, the aforementioned inequalities are to be considered satisfied within predetermined temperature ranges of the fluid F and/or of the environment on the basis of the specific application in which the equipment 1 is intended to be used.

In other words, the maximum reading error in the second measurement $P_{AA}$ of the absolute pressure of the external environment carried out by the second sensor 14 is suitably less than or equal to the maximum predetermined error value for the relative measurement of the pressure of the fluid $P_{RF}$.

At the same time, the sum of the maximum reading error of the first measurement $P_{AF}$ of absolute pressure of the fluid carried out by the first sensor 2 and the maximum reading error of the second measurement $P_{AA}$ of absolute pressure of the external environment is suitably less than or equal to maximum error allowed for the measurement of the relative pressure of the fluid $P_{RF}$.

Similarly, the maximum error of reading of the first measurement $P_{AF}$ of absolute pressure of the fluid is suitably less than or equal to the difference between the maximum error allowed for the measurement of the relative pressure of the fluid $P_{RF}$ and the maximum error of reading of the second measurement $P_{AA}$ of absolute pressure of the external environment.

In this way, the apparatus 1 according to the present invention makes it possible to obtain both absolute and relative pressure measurements that are always reliable.

Conveniently, the first sensor 2 and the second sensor 14 can be of the same type and preferably the same, in particular in the case in which the expected relative pressure $P_{RF}$ of the fluid F is low (ie less than about 0.5 bar), as normally in the case of smart metering applications for low pressure distribution networks.

In this situation, since the first sensor 2 is of the same type as the second sensor 14, this type of sensor conveniently has a maximum reading error "ε" equal to:

$$\varepsilon \leq \min[\varepsilon_{max\_}P_{RF}; \varepsilon_{max\_}P_{AF}]$$

In other words, the maximum reading error for the first sensor 2 and for the second sensor 14, being of the same type, is suitably less than or equal to the lesser of the maximum errors allowed by the smart metering application (preferential for the present invention) for the measurement of the relative pressure of the fluid $P_{RF}$ and for the measurement of the absolute pressure of the fluid $P_{AF}$.

Advantageously, the apparatus 1 comprises at least a first temperature sensor 4 which is arranged and configured to detect the temperature $T_F$ of the fluid F and to send to the electronic unit 25 a corresponding signal representative of the temperature $T_F$.

Preferably, the first temperature sensor 4 is housed inside the first containment casing 7 and configured to detect a first temperature measurement $T_F$ of the fluid F and to send at least a third electronic signal to the electronic unit 25 containing the first measurement of temperature $T_F$.

Conveniently, the electronic unit 25 is configured to receive and process the first temperature measurement $T_F$ of the fluid F and to adapt the value of the first absolute pressure measurement $P_{AF}$ of the fluid F on the basis of the measured $T_F$ value.

The electronic unit 25 is advantageously configured to receive and process the first temperature measurement $T_F$ of the fluid F, which is advantageously used to consequently calculate a volume value of the fluid F, in particular on the basis of the aforementioned reference thermodynamic conditions. In particular, the electronic unit 25 is configured to calculate the volume of the fluid F on the basis of the first measurement of absolute pressure $P_{AF}$ of the fluid F and of the temperature measurement $T_F$ of the fluid F.

The apparatus 1 according to the present invention comprises advantageously moreover at least a second temperature sensor 20 which is arranged and configured to detect the temperature $T_A$ of the external environment A and to send to the electronic unit 25 a corresponding signal representative of the temperature $T_A$.

The presence of a second temperature sensor 20 which is dedicated to detecting the temperature $T_A$ of the external environment A is particularly advantageous as it allows the prompt determination of an overtemperature condition in the external environment A, for example to determine a situation of fire or other anomalous situation, and this in order to then command the closure of a safety valve.

Conveniently, therefore, in the solution according to the invention, the detection of the temperature $T_A$ of the external environment A carried out by the second temperature sensor 20 can be used for safety purposes, to thus command the closure of a safety valve. In particular, for this purpose, the electronic unit 25 is configured to compare the value of the temperature $T_A$ of the external environment A, detected by means of the second temperature sensor 20, with a threshold value, to thus command the closure of a corresponding safety valve.

Conveniently, the relative pressure $P_R$—calculated starting from the absolute pressures $P_{AF}$ and $P_{AA}$ detected by the corresponding absolute pressure sensors 2 and 14—is not used alone for safety purposes, and in particular the control of the closing of a safety valve only on the basis of the comparison between the relative pressure $P_R$ and a threshold value in order to control.

Preferably, the relative pressure $P_R$ is used exclusively for metrological purposes, to thus determine the operating pressure of the gas.

Conveniently, in a possible embodiment, the relative pressure $P_R$— calculated starting from the absolute pressures $P_{AF}$ and $P_{AA}$ detected by the corresponding absolute pressure sensors 2 and 14—is used in combination with the detection of the temperature $T_A$ of external environment A carried out by the second temperature sensor 20 in order to command or not the closing of a safety valve. In particular, for this purpose, the electronic unit 25 is configured to command the closing of a corresponding safety valve on the basis of the pressure $P_R$ and also on the basis of the temperature $T_A$ of the external environment A, detected by the second sensor. temperature 20.

Preferably, the second temperature sensor 20 is housed inside the second containment casing 13 and configured to detect a second temperature measurement $T_A$ of the external environment A and to send at least a fourth electronic signal to the electronic unit 25 containing the second temperature $T_A$ measurement.

The electronic unit 25 is configured to receive and process the second temperature measurement $T_A$ of the external environment A and to adapt the value of the second absolute pressure measurement $P_{AA}$ of the external environment A on the basis of its temperature value $T_A$.

Advantageously, the electronic unit 25 is configured to adapt the absolute pressure measurements $P_{AA}$ and $P_{AF}$ respectively to the values of $T_A$ and $T_F$ so as to maintain $\varepsilon_{AA}$ and $\varepsilon_{AF}$ as the respective temperatures vary within predetermined limit values, preferably both of the same sign. Therefore, the apparatus 1 object of the present invention is able to simultaneously provide the measurement of the absolute pressure $P_{AF}$ of the fluid F, with precision equal to $(1-\varepsilon_{AA})$, the measurement of the relative pressure $P_{RF}$ of the fluid F, in particular calculated as $P_{RF}=P_{AF}-P_{AA}$, with precision equal to $(1-\varepsilon_{AF}-\varepsilon_{AA})$, the temperature $T_F$ of the fluid F, the temperature $T_A$ of the external environment A.

Advantageously, therefore, the determination of the absolute pressure of the gas $P_{AF}$ is suitably compensated on the basis of the temperature $T_F$ of the fluid which is detected by the first temperature sensor 4 and also the determination of the absolute pressure of the foreign environment $P_{AA}$ is suitably compensated on the basis of the temperature $T_A$ of the external environment which is detected by the second dedicated temperature sensor 20. Conveniently, in particular, the second temperature sensor 20 is a temperature sensor which is further/additional with respect to the first temperature sensor 4 and which is dedicated to measuring the temperature $T_A$ of the external environment.

Preferably, the data detected by all sensors, both absolute pressure and temperature, are suitably filtered by means of a Kalman filter.

Advantageously, the presence of two absolute pressure sensors, to respectively detect the absolute pressure $P_{AF}$ of the gas and the absolute pressure $P_{AA}$ of the external environment, and the presence of two temperature sensors, to respectively detect the gas temperature and the temperature of the external environment, is particularly advantageous as it allows the conversion of volumes to be carried out, in order to precisely determine the volume of the gas at the reference thermodynamic conditions (in particular using the temperature $T_F$ of the gas supplied by the first temperature sensor 4, together with the absolute pressure of the fluid supplied by the first pressure sensor 2) and, at the same time, allows to calculate precisely the relative operating pressure of the gas (in particular by also adapting the value of the second absolute pressure measurement $P_{AA}$ of external environment A on the basis of the temperature value $T_A$).

Advantageously, the first pressure sensor 2 and the first temperature sensor 4, used for measuring the temperature $T_F$, can be integrated in the same device.

Advantageously, the second pressure sensor 14 and the second temperature sensor 20, used for measuring the temperature $T_A$, can be integrated in the same device.

The present invention has been illustrated and described in a preferred embodiment thereof, but it is understood that executive variations may be applied to it in practice, without however departing from the scope of protection of the present patent for industrial invention.

The apparatus 1 according to the present invention therefore makes it possible to:

have an apparatus for measuring a fluid capable of making the measurement of the operating pressure of a fluid used for the purposes of checking the networks, reducing the areas of risk of losses;

have an apparatus for measuring a fluid capable of making the measurement of the absolute pressure used for the conversion of volumes to the reference thermodynamic conditions economically convenient;

have an equipment for measuring a fluid capable of making the measurement of the operating pressure of the fluid used for network control purposes constructively simple, safe and economically convenient, together with making the measurement constructively simple, safe and economically convenient of the absolute pressure used for the conversion of volumes to the reference thermodynamic conditions.

The invention claimed is:

1. An apparatus (1) for measuring a flow of fluid (F) present and circulating inside a pipe, the apparatus comprising:

a first containment casing (7) provided with a first opening (9) for the inlet of a fluid flow inside it and a second opening (11) for the fluid outlet, an electronic processing and/or control unit (25), at least a first absolute pressure sensor (2) which is arranged and configured to detect at least a first absolute pressure measurement PAF of said fluid (F) which crosses and/or circulates in said first enclosure (7) and sends to said unit electronics (25) at least one first electronic signal containing and/or representative of the first $P_{AF}$, at least a second absolute pressure sensor (14) which is arranged and configured to detect at least a second absolute pressure measurement $P_{AA}$ of an external environment (A), in which said equipment is intended to be installed, and send to said electronic unit (25) at least one second electronic signal containing and/or representative of the second measurement $P_{AA}$, at least a first temperature sensor (4) which is arranged and configured to detect a first temperature measurement $T_F$ of said fluid (F) and to send to said electronic unit (25) at least a third electronic signal containing and/or representative of said first temperature measurement $T_F$, at least a second temperature sensor (20) which is arranged and configured to detect a second temperature measurement $T_A$ of said external environment (A) and to send to said electronic unit (25) at least a fourth electronic signal containing and/or representative of said second temperature measurement $T_A$, said electronic processing and/or control unit (25) is electronically connected to said first absolute pressure sensor (2), to said second absolute pressure sensor (14), to said first temperature sensor (4) and to said second temperature sensor (20), to receive so-called corresponding electronic signals detected by said sensors said electronic unit (25) comprises at least one processing module configured to receive the corresponding electronic signals containing and/or representative of the first absolute pressure measurement $P_{AF}$ of said fluid (F), of the second absolute pressure measurement $P_{AA}$ of the external environment (A), of said first temperature measurement $T_F$ of said fluid (F), of said second temperature measurement $T_A$ of said external environment (A), said processing module being also configured for:

adapting the value of said first absolute pressure measurement $P_{AF}$ of said fluid (F) on the basis of said first temperature measurement $T_F$ of said fluid (F), adapt the value of said second absolute pressure measurement $P_{AA}$ of said external environment (A) on the basis of said second temperature measurement $T_A$ of said external environment (A), calculate a relative pressure value $P_R$ of said fluid (F) using said first measurement of absolute pressure $P_{AF}$ of said fluid (F), which is adapted on the basis of said first temperature measurement $T_F$, and using said second measurement of absolute pressure $P_{AA}$ of said external environment (A), which is adapted on the basis of said first temperature measurement $T_A$, also calculating a volume value of said fluid (F) on the basis of said first temperature measurement $T_F$ of said fluid (F) and of said first absolute pressure measurement $P_{AF}$ of said fluid (F).

2. The apparatus according to claim 1, wherein said electronic unit (25) is configured to command a closure of a safety valve on the basis of said second temperature measurement $T_A$ of said external environment (A) detected by said second temperature sensor (20), said safety valve being electronically connected to said electronic unit (25) and being housed inside the first casing (7) and/or being positioned externally with respect to said first casing (7).

3. The apparatus according to claim 1, wherein said electronic unit (25) is configured to command a closure of a safety valve on the basis of said second temperature measurement $T_A$ of said external environment (A) and of said relative pressure value $P_R$ of said fluid (F), said safety valve being electronically connected to said electronic unit (25) and being housed inside the first casing (7) and/or being positioned externally with respect to said first casing (7).

4. The apparatus according to claim 1, wherein said electronic unit (25) is configured to compare the second temperature measurement $T_A$ of said external environment (A) with at least one threshold value in order to determine whether or not an overtemperature condition of said external environment (A), to thus identify an anomalous situation, for example a fire.

5. The apparatus according to claim 1, further comprising a second containment casing (13) fluidically separated from said first casing (7) and configured to be placed in fluid communication with the ambient air external (A).

6. The apparatus according to claim 5, wherein said at least one first absolute pressure sensor (2) is housed inside said first casing (7) and said at least one second absolute pressure sensor (14) is associated with said second casing (13).

7. The apparatus according to claim 1, wherein at least one of: said at least one first absolute pressure sensor (2) is housed inside said first casing (7) or said at least one second pressure sensor absolute pressure (14) is positioned externally to said first casing (7).

8. The apparatus (1) for measuring a fluid (F) according to claim 1, wherein said processing module of said electronic unit (25) is configured to calculate at least said relative pressure value $P_R$ of said fluid (F) as the difference between said first absolute pressure measurement $P_{AF}$ of said fluid (F) contained in said first electronic signal and said second absolute pressure measurement $P_{AA}$ of said external environment (A) contained in said second electronic signal.

9. The apparatus according to claim 1, wherein said electronic unit (25) comprises at least one receiving module electronically connected to said first absolute pressure sensor (2) and to said second absolute pressure sensor (14) and is configured to receive and acquire said first electronic signal and said second electronic signal in a periodic manner.

10. The apparatus according to claim 1, wherein said at least one first temperature sensor (4) is housed inside the first containment casing (7) and said at least one second temperature sensor (20) is housed inside the second containment casing (13).

11. The apparatus according to claim 1, wherein a flow sensor (6) is also housed inside the first casing (7), to thus detect the flow rate of said fluid (F) which passes through and/or circulates in said first casing (7).

12. The apparatus according to claim 1, wherein said first containment casing (7) is configured and intended to be housed inside said pipe in which said fluid (F) and said second containment casing circulate (13) is configured and intended to be housed outside said pipe.

13. The apparatus according to claim 1, wherein the electronic unit (25) is housed inside the second casing (13).

14. The apparatus according to claim 1, wherein said first casing (7) is watertight.

15. The apparatus according to claim 1, wherein said first absolute pressure sensor (2) and said first temperature sensor (4) are housed inside the first casing (7) and are electronically connected to said electronic unit (25) by means of connection means (24) which pass through said first casing, preferably defining a crossing which is watertight.

16. The apparatus according to claim 1, wherein said first absolute pressure sensor (2) being electronically connected to said electronic unit (25) by means of connection (24) configured to be placed through said pipe in a watertight manner.

17. The apparatus according to claim 1, further comprising at least one memory unit, housed inside said second containment casing (13), electronically connected to said electronic unit (25) and containing algorithms for the calculation of at least said relative pressure value $P_R$ of said fluid (F).

18. The apparatus according to claim 1, wherein said first absolute pressure sensor (2) and said second absolute pressure sensor (14) are configured so that $\varepsilon_{AA} \leq \varepsilon_{max\_}P_{AF}$ and also so that $\varepsilon_{AF} + \varepsilon_{AA} \leq \varepsilon_{max\_}P_{RF}$ Where:

$\varepsilon_{AF}$ corresponds to the maximum reading error in absolute value for the first absolute pressure sensor (2), $\varepsilon_{AA}$ corresponds to the maximum reading error in absolute value for the second absolute pressure sensor (14), $\varepsilon_{max\_}P_{AF}$ corresponds to a maximum threshold value for the measurement of the absolute pressure $P_{AF}$ of the fluid (F), $\varepsilon max\_P_{RF}$ corresponds to a maximum threshold value for the measurement of relative pressure $P_R$ of said fluid (F).

19. The apparatus according to claim 1, wherein said first absolute pressure sensor (2) and said second absolute pressure sensor (14) are of the same type and have the same maximum reading error.

20. The apparatus according to claim 1, wherein the electronic unit (25) is configured to adapt the absolute pressure measurements $P_{AA}$ and $P_{AF}$ respectively to the temperature measurements $T_A$ and $T_F$ so as to maintain, as the respective temperatures vary, the maximum reading error $\varepsilon_{AF}$ in absolute value for the first absolute pressure sensor (2) and the maximum reading error $\varepsilon_{AA}$ in absolute value for the second absolute pressure sensor (14) within values predetermined limits.

\* \* \* \* \*